United States Patent
Chu et al.

(10) Patent No.: US 11,271,686 B2
(45) Date of Patent: Mar. 8, 2022

(54) HYBRID AUTOMATIC REPEAT REQUEST ACKNOWLEDGEMENT AND UPLOAD MULTIUSER OPERATION

(71) Applicant: NXP USA, Inc., Austin, TX (US)

(72) Inventors: Liwen Chu, San Ramon, CA (US); Yan Zhang, Palo Alto, CA (US); Hongyuan Zhang, Freemont, CA (US); Huiling Lou, Sunnyvale, CA (US)

(73) Assignee: NXP USA, Inc., Austin, TX (US)

(*) Notice: Subject to any disclaimer, the term of this patent is extended or adjusted under 35 U.S.C. 154(b) by 112 days.

(21) Appl. No.: 16/851,790

(22) Filed: Apr. 17, 2020

(65) Prior Publication Data

US 2020/0336254 A1    Oct. 22, 2020

Related U.S. Application Data

(60) Provisional application No. 62/837,088, filed on Apr. 22, 2019, provisional application No. 62/836,549, filed on Apr. 19, 2019.

(51) Int. Cl.
| | |
|---|---|
| *H04L 5/00* | (2006.01) |
| *H04L 1/18* | (2006.01) |
| *H04L 1/00* | (2006.01) |

(52) U.S. Cl.
CPC ......... *H04L 1/1819* (2013.01); *H04L 1/0008* (2013.01); *H04L 1/0061* (2013.01); *H04L 1/1835* (2013.01); *H04L 1/1864* (2013.01); *H04L 1/1874* (2013.01); *H04L 1/1893* (2013.01); *H04L 1/1896* (2013.01); *H04L 5/0055* (2013.01); *H04L 1/1812* (2013.01)

(58) Field of Classification Search
None
See application file for complete search history.

(56) References Cited

U.S. PATENT DOCUMENTS

| | | | |
|---|---|---|---|
| 9,876,614 B1 | 1/2018 | Sun et al. | |
| 2016/0330714 A1* | 11/2016 | Hedayat | H04W 72/1289 |
| 2017/0288817 A1* | 10/2017 | Cao | H04L 1/1819 |
| 2018/0014302 A1* | 1/2018 | Asterjadhi | H04W 52/365 |
| 2018/0205441 A1* | 7/2018 | Asterjadhi | H04B 7/0626 |
| 2019/0215037 A1* | 7/2019 | Seok | H04B 17/336 |
| 2019/0306920 A1* | 10/2019 | Son | H04W 74/004 |
| 2020/0136764 A1* | 4/2020 | Zhang | H04L 1/0083 |

(Continued)

OTHER PUBLICATIONS

U.S. Appl. No. 15/876,360; Inventor: Yakun Sun et al.; "Hybrid Automatic Repeat Request For Wireless Local Area Network;"; Filed Date Jan. 22, 2018.

(Continued)

*Primary Examiner* — Brandon M Renner

(57) ABSTRACT

Various embodiments relate to a method for transmitting hybrid automatic repeat request (HARQ) coded data by an access point, including: receiving by the access point buffered frame information from a plurality of stations; determining the HARQ coding information and resources for each of the plurality of stations; transmitting a first trigger frame including the HARQ coding information and resource information for each of the plurality of stations; receiving a first HARQ transmission from the plurality of stations; and decoding the received HARQ transmission from the plurality of stations.

22 Claims, 13 Drawing Sheets

(56) References Cited

U.S. PATENT DOCUMENTS

2020/0267033 A1* 8/2020 Yan .................... H04L 27/10
2020/0287664 A1* 9/2020 Fang .................. H04W 48/12
2021/0006444 A1* 1/2021 Jang ................. H04L 27/2603

OTHER PUBLICATIONS

U.S. Appl. No. 16/667,521; Inventor Yan Zhang et al.; "Physical Layer (PHY) Data Unit Format For Hybrid Automatic Repeat Request (HARQ);"; Filed Date Oct. 29, 2019.
U.S. Appl. No. 16/667,534; Inventor Yan Zhang et al.; "Method and Apparatus for Generating a Physical Layer (PHY) Data Unit for Hybrid Automatic Repeat Request (HARQ);"; Filed Date Oct. 29, 2019.
U.S. Appl. No. 16/689,107; Inventor Liwen Chu et al.; "Hybrid ARQ MAC Support In WLAN Devices;"; Filed Date Nov. 20, 2019.

* cited by examiner

HYBRID AUTOMATIC REPEAT REQUEST ACKNOWLEDGEMENT AND UPLOAD MULTIUSER OPERATION

CROSS-REFERENCE TO RELATED APPLICATIONS

This application claims benefit to U.S. Provisional Patent Application No. 62/837,088 filed Apr. 22, 2019 and U.S. Provisional Patent Application No. 62/836,549 filed Apr. 19, 2019, the contents of which are hereby incorporated by reference for all purposes as if fully set forth herein.

TECHNICAL FIELD

Various exemplary embodiments disclosed herein relate generally to hybrid automatic repeat request acknowledgement and upload multiuser operation.

BACKGROUND

Hybrid automatic repeat request (HARQ) is a combination of high-rate forward error-correcting coding and automatic repeat request (ARQ) error-control. In standard ARQ, redundant bits are added to data to be transmitted using an error-detecting (ED) code such as a cyclic redundancy check (CRC). Receivers detecting a corrupted message will request a new message from the sender. In Hybrid ARQ, the original data is encoded with a forward error correction (FEC) code, and the parity bits are either immediately sent along with the message or only transmitted upon request when a receiver detects an erroneous message. The ED code may be omitted when a code is used that can perform both forward error correction (FEC) in addition to error detection. The FEC code is chosen to correct an expected subset of all errors that may occur, while the ARQ method is used as a fallback to correct errors that are uncorrectable using only the redundancy sent in the initial transmission. As a result, hybrid ARQ performs better than ordinary ARQ in poor signal conditions, but in its simplest form this comes at the expense of significantly lower throughput in good signal conditions. There is typically a signal quality cross-over point below which simple hybrid ARQ is better, and above which basic ARQ is better.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for transmitting hybrid automatic repeat request (HARQ) coded data by an access point, including: receiving by the access point buffered frame information from a plurality of stations; determining the HARQ coding information and resources for each of the plurality of stations; transmitting a first trigger frame including the HARQ coding information and resource information for each of the plurality of stations; receiving a first HARQ transmission from the plurality of stations; and decoding the received HARQ transmission from the plurality of stations.

Various embodiments are described, further including transmitting a second trigger frame to request buffered frame information from the plurality of stations.

Various embodiments are described, wherein the buffered frame information includes the number of buffered frames and the length of each of the buffered frames.

Various embodiments are described, wherein the HARQ coding information includes the number of HARQ coding units and the length of each of the HARQ coding units.

Various embodiments are described, wherein the first trigger frame includes a common information field and user information fields for each station, where the user information fields are the same length and include a HARQ coding information field.

Various embodiments are described, wherein HARQ coding information field is padded with reserved values to fill the length of the user information field.

Various embodiments are described, wherein HARQ coding information field is filled with reserve values for a non-HARQ transmission from a station.

Various embodiments are described, wherein the first trigger frame includes a common information field and user information fields for each station, where the user information fields have lengths based upon a number of requested HARQ coding units.

Various embodiments are described, further including sending an acknowledgment for each of the transmissions from the stations.

Various embodiments are described, further including receiving a second HARQ transmission from each of the stations, and combining the first and second HARQ transmissions from each of the stations.

Various embodiments are described, wherein the first and second HARQ transmissions include the same HARQ coded information.

Various embodiments are described, wherein the first and second HARQ transmissions include different HARQ coded information.

Further various embodiments relate to a method for transmitting hybrid automatic repeat request (HARQ) coded data by a station, including: receiving by the station a trigger frame specifying resources for the station; determining HARQ coding information for buffered frames to be transmitted by the station; and transmitting a first HARQ trigger based (TB) physical protocol data unit (PPDU), wherein the physical header of the HARQ TB PPDU includes a SIG-C field including the HARQ coding information.

Various embodiments are described, wherein the SIG-C field includes a HARQ unit information field, cyclic redundancy code (CRC) of the HARQ unit information field, and a reserved field with a length that allows time for an access point to prepare for the HARQ reception.

Various embodiments are described, wherein the SIG-C field includes a HARQ unit information field, a first cyclic redundancy code (CRC) of the HARQ unit information field, control field with a length that allows time for an access point to prepare for the HARQ reception, and a second CRC of the control field.

Various embodiments are described, wherein the SIG-C field includes a HARQ unit information field, control field with a length that allows time for an access point to prepare for the HARQ reception, and a CRC of the HARQ unit information field and the control field.

Various embodiments are described, wherein the HARQ coding information includes the number of HARQ coding units and the length of each of the HARQ coding units.

Various embodiments are described, further including transmitting a second HARQ TB PPDU, wherein the first and second HARQ TB PPDU transmissions include the same HARQ coded information.

Various embodiments are described, further including transmitting a second HARQ TB PPDU, wherein the first and second HARQ TB PPDU transmissions include different HARQ coded information.

Further various embodiments relate to a method for transmitting hybrid automatic repeat request (HARQ) coded data by an access point, including: transmitting a first trigger frame including resource information for each of the plurality of stations; receiving by the access point HARQ coding information from a plurality of stations in a first HARQ trigger based (TB) physical protocol data unit (PPDU); transmitting a second trigger frame in response to the first HARQ TB PPDU; receiving a second HARQ TB PPDU including HARQ coded information from the plurality of stations; and decoding the received second HARQ TB PPDU from the plurality of stations.

Various embodiments are described, wherein the HARQ coding information includes the number of HARQ coding units and the length of each of the HARQ coding units.

Various embodiments are described, further including sending an acknowledgment to second HARQ TB PPDU.

Various embodiments are described, further including receiving a third HARQ TB PPDU from each of the stations, and combining the second and third HARQ TB PPDUs from each of the stations.

Various embodiments are described, wherein the second and third HARQ TB PPDU include the same HARQ coded information.

Various embodiments are described, wherein the second and third HARQ TB PPDU include different HARQ coded information.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

As described above, HARQ provides a mechanism to overcome transmission errors in a communication system. HARQ may be applied to the IEEE 802.11 wireless networking standard to overcome transmission errors. Specifically, HARQ techniques may be implemented in the next generation of the IEEE 802.11ax networking standard.

HARQ may be implemented using soft combining. Received coded data block are often stored at the receiver rather than discarded, and when the re-transmitted block is received, the two blocks may be combined. There are two main soft combining methods in HARQ: chase combining; and incremental redundancy.

Figure 1A:
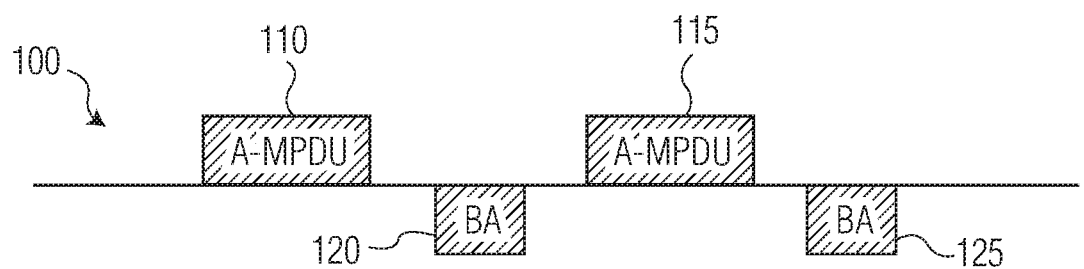
FIG. 1A illustrates HARQ chase combining.

FIG. 1A illustrates HARQ chase combining. In chase combining, every re-transmission contains the same information (data and parity bits). The receiver uses maximum-ratio combining to combine the received bits with the same bits from previous transmissions. Because all transmissions are identical, chase combining may be seen as additional repetition coding. In FIG. 1A a station transmits an aggregated MAC protocol data unit (A-MPDU) 110 to an access point (AP) that includes HARQ coding unit(s). The AP may then respond with a block acknowledgement message (BA) 120 that includes an acknowledgement of correct receipt for each MPDU in the A-MPDU 110. In FIG. 1A, the A-MPDU 110 is not correctly received, so the station transmits the A-MPDU 115 where A-MPDU 115 is a duplicate of A-MPDU 110. The receiver at the AP can then combine the first A-MPDU 110 and second A-MPDU 115 to increase the ability to correct for errors in transmission.

Figure 1B:
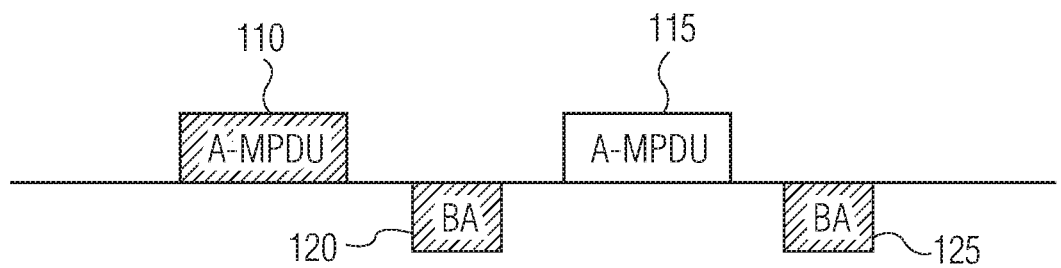
FIG. 1B illustrates HARQ incremental redundancy.

FIG. 1B illustrates HARQ incremental redundancy. In incremental redundancy, every re-transmission contains different information than the previous one. For example, multiple sets of coded bits are generated, each representing the same set of information bits. The re-transmission typically uses a different set of coded bits than the previous transmission. Thus, at every re-transmission the receiver gains extra information. In FIG. 1B a station transmits an aggregated MAC protocol data unit (A-MPDU) 110 to an access point (AP) that includes HARQ coding unit(s) with a first set of coding bits. The AP may then respond with a block acknowledgement message (BA) that includes an acknowledgement of correct receipt for each MPDU in the A-MPDU 110. In FIG. 1B, the A-MPDU is not correctly received, so the station transmits the A-MPDU 115 again where A-MPDU 115 includes different set of coded bits than A-MPDU 110. The receiver at the AP can then combine the first A-MPDU 110 and second A-MPDU 115 to increase the ability to correct for errors in transmission.

It will now be described how information and decisions are made regarding the use of HARQ coding unit in high efficiency (HE) trigger based (TB) physical protocol data units (PPDU). More specifically it will be described how to specify and use HARQ coding units in upload (UL) multiuser (MU) operation, where AP uses a trigger frame which provides scheduling information such as resource unit allocations (RUs), modulation and coding scheme (MCS) that will be used for each station as well as providing synchronization of an uplink transmission from the stations. The following frame types may be allowed in a HARQ PPDU: QoS data frame; action frame; action no Ack frame; other class 3 management frames; a control frame in downlink (DL) MU PPDU to carry the resource allocation for the UL acknowledgement; and a control frame or QoS Null frame in UL MU PPDU to request UL transmission resources.

Figure 2:
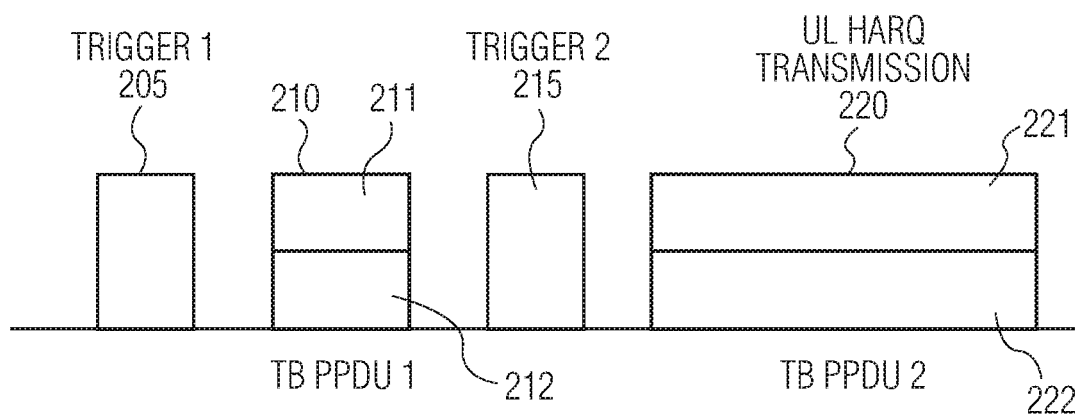
FIG. 2 illustrates the use of trigger frames for sharing HARQ coding unit information.

In order to use HARQ coding in UL MU operation, HARQ control information needs to be shared between the AP and the stations that will be transmitting information to the AP. Various embodiments of exchanging HARQ control information will now be described;

In a first embodiment, HARQ coding unit information will be shared using trigger frames. FIG. 2 illustrates the use of trigger frames for announcing HARQ coding unit information. The AP optionally sends a first trigger frame 205 requesting that the stations report the number and length of each buffered frame that the station wishes to transmit. The first trigger frame 205 will provide allocation information to each station of interest indicating which RUs are assigned and the MSC to use. The stations in response will transmit a response based upon the first trigger 205. These responses combine to from the first TB PPDU 210. The first TB PPDU 210 includes a first portion 211 transmitted by a first station STA1 and a second portion 212 transmitted by a second station STA2. The first portion 211 indicates the number and length of each buffered frame that STA1 has to transmit, and the second portion 212 indicates the number and length of each buffered frame that STA2 has to transmit. For example, STA1 may have 10 buffered frames in octets and STA2 may have 8 buffered frames in octets to transmit. The AP then transmits a second trigger frame 215 that carries HARQ coding unit parameters and allocates resources for STA1's and STA2's HARQ coding units. The HARQ coding unit parameters will be used by the STA to transmit HARQ coding units in the TB PPDU. In this example, 6 HARQ coding units may be allocated for STA1, and 4 HARQ units may be allocated for STA2. Next, STA1 transmits its 6 HARQ coding units, and STA2 transmits it 4 HARQ coding units, which combine to form the second TB PPDU 220. STA1 transmits a first portion 221 of the TB PPDU 220, and STA2 transmits a second portion 222 of the TB PPDU 220.

In another embodiment, the stations may unsolicited transmit the number and length of frames to the AP, then the AP would use this information to transmit a trigger frame like trigger frame 215 to set up the HARQ coded transmission of a TB PPDU.

Figure 3:
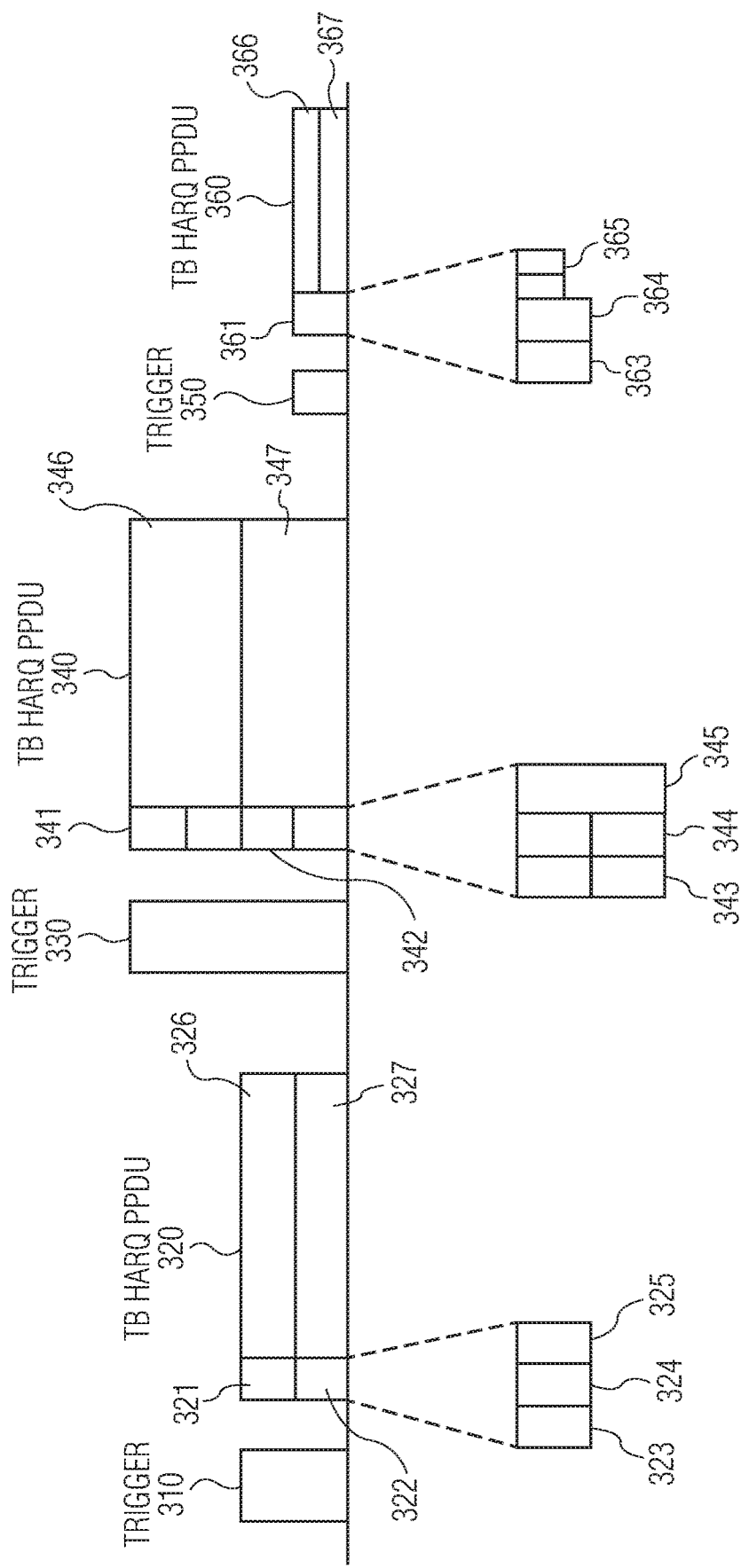
FIG. 3 illustrates examples of HARQ coding information being transmitted in the header of TB HARQ PPDUs.

In another embodiment, the HARQ coding information will be shared using the HE TB PHY header, where the HARQ coding information is decided by the STAs. It is noted that the HARQ coding unit information may include specifying HARQ coding units with different lengths. FIG. 3 illustrates examples of HARQ coding information being transmitted in the header of TB HARQ PPDUs. A first trigger frame 310 is associated with a first TB HARQ PPDU 320. The first trigger frame 310 soliciting the TB HARQ PPDU 320 defines the MCS of the PPDU data, the RU size, and the PPDU length. Further, the first trigger frame 310 defines the extreme high throughput (EHT) SIG-C field length. In this embodiment, each station determines the HARQ coding unit length and the number HARQ coding units. It is noted that the HARQ coding unit information may include specifying HARQ coding units with different lengths. This information is then sent back to the AP in the EHT SIG-C field. Each station (in this example two stations) sends its own TB HARQ PPDU 326, 327 each with its own header 321, 322. The header 321, 322 may include the legacy short training field (STF), legacy long training field (LTF), and legacy SIG fields 323. The header 321, 322 may also include the EHT SIG-A field 324. Finally, the header 321, 322 includes the EHT SIG-C field 325. The EHT SIG-C field 325 is shown for a 20 MHz RU.

A second trigger frame 330 is associated with a second TB HARQ PPDU 340. The second trigger frame 330 soliciting the TB HARQ PPDU 340 defines the MCS of the PPDU data, the RU size, and the PPDU length. Further, the second trigger frame 330 defines the EHT SIG-C field length. As before, each station sends its HARQ coding unit length and the number HARQ coding units to the AP in the EHT SIG-C field 345. It is noted that the HARQ coding unit information may include specifying HARQ coding units with different lengths. Each station (in this example two stations) sends its own TB HARQ PPDU 346, 347 each with its own header 341, 342. The header 341, 342 may include repeated STF, LTF, and legacy SIG field 343. The header 341, 342 may also include repeated EHT SIG-A field 344. Finally, the header 341, 342 includes the EHT SIG-C field 345. The EHT SIG-C field 345 is shown for a >20 MHz RU.

A third trigger frame 350 is associated with a third TB HARQ PPDU 340. The third trigger frame 350 soliciting the TB HARQ PPDU 360 defines the MCS of the PPDU data, the RU size, and the PPDU length. Further, the third trigger frame 350 defines the EHT SIG-C field length. As before, each station sends its HARQ coding unit length and the number HARQ coding units to the AP in the EHT SIG-C field 365. It is noted that the HARQ coding unit information may include specifying HARQ coding units with different lengths. Each station (in this example two stations) sends its own TB HARQ PPDU 366, 367 each with its own header 361, 362. The header 361, 362 may include STF, LTF, and legacy SIG field 363. The header 361, 362 may also include EHT SIG-A field 364. Finally, the header 361, 362 includes two EHT SIG-C fields 365. The two EHT SIG-C fields 365 are shown for two RUs with a bandwidth <20 MHz RU.

Figure 4C:
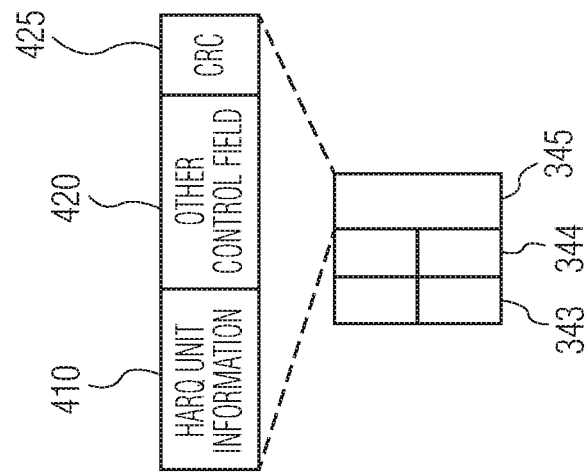
FIGS. 4A-4C illustrate three different options for organizing the EHT SIG-C field to carry the HARQ unit information.
Figure 4B:
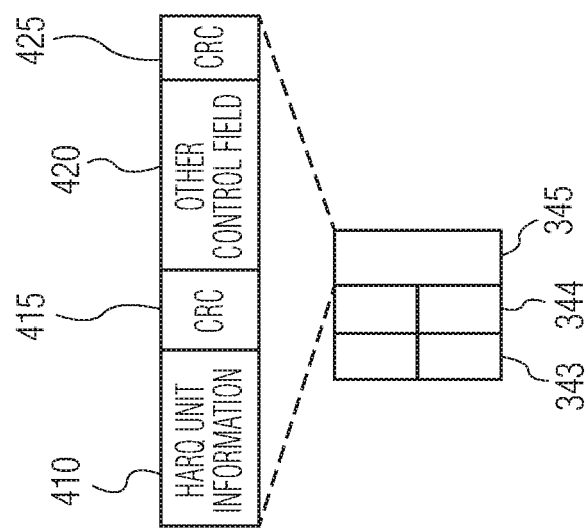
Figure 4A:
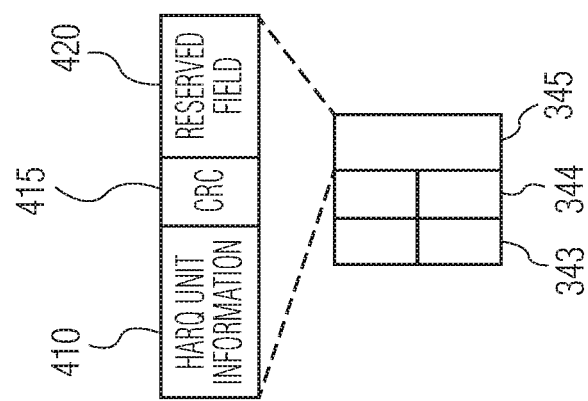

FIGS. 4A-4C illustrate three different options for organizing the EHT SIG-C field to carry the HARQ unit information. The structure shown is the same as the headers 341, 342 from FIG. 3 for the >20 MHz RU case. In FIG. 4A, the EHT SIG-C has a HARQ unit information field 410 followed by a CRC filed 415 and a reserved field 420. The CRC field 415 may provide a CRC of the HARQ unit information 410 to allow for a check that the HARQ unit information 410 is received correctly. The reserved field may be configured to allow the AP to have enough time to prepare for HARQ reception. In FIG. 4B, the EHT SIG-C has a HARQ unit information field 410 followed by a CRC filed 415, other control field 420, and a second CRC 425. As before, the CRC field 415 may provide a CRC of the HARQ unit information 410 to allow for a check that the HARQ unit information 410 is received correctly. The second CRC 425 may provide a CRC of the other control field 420 to allow for a check that the other control field 420 is received correctly. The other control field 420 may be configured to allow the AP to have enough time to prepare for HARQ reception. Further, the other control field 420 may include control information for STA's future operation, e.g., an UL TB transmission. In FIG. 4C, the EHT SIG-C similar to the EHT SIG-C in FIG. 4B, but in FIG. 4C only one CRC 425 is included that is a CRC of both the HARQ unit information 410 and the other control field 420.

Figure 5:
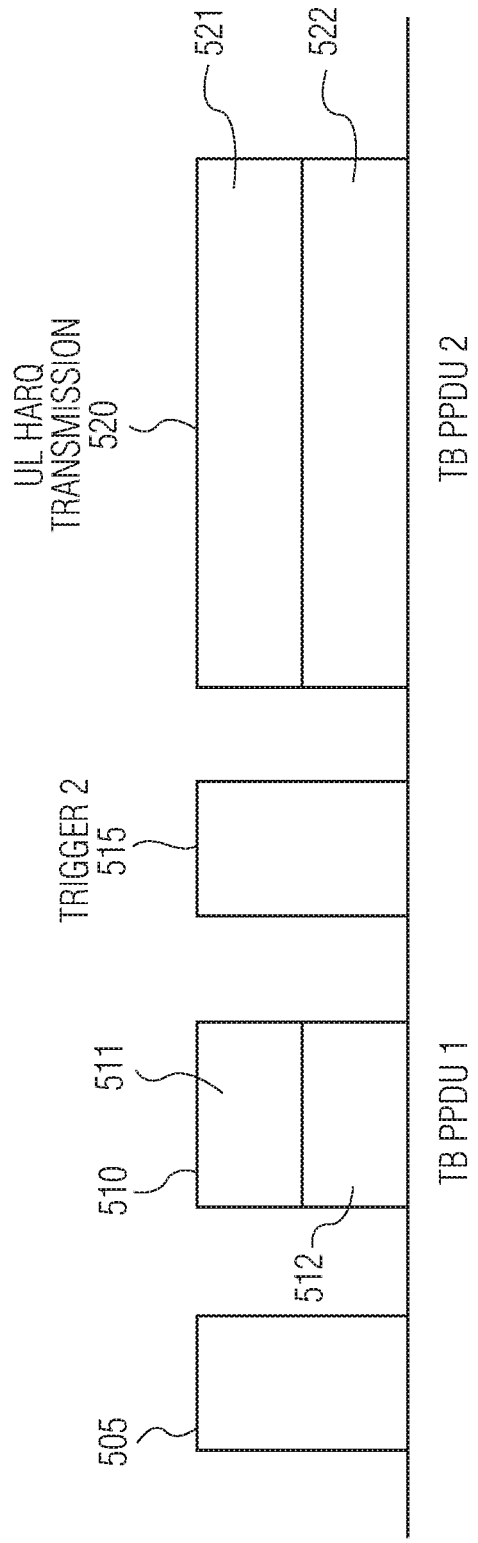
FIG. 5 illustrates transmission of HARQ coding unit information in an UL frame.

FIG. 5 illustrates transmission of HARQ coding unit information in an UL frame. The AP sends a first trigger frame 505 providing allocation information to each station of interest indicating which RUs are assigned and the MSC to use in a second TB PPDU 520. The stations in response will transmit a response based upon the first trigger 505. These responses combine to from the first TB PPDU 510. The first TB PPDU 510 includes a first portion 511 transmitted by a first station STA1 and a second portion 512 transmitted by a second station STA2. The first portion 511 indicates the HARQ coding unit information that STA1 will use to transmit the second PPDU 521, and the second portion 512 indicates the HARQ coding unit information that STA2 will use to transmit the second PPDU 522. The AP then transmits a second trigger frame 515. In this example as before, 6 HARQ coding units may be allocated for STA1, and 4 HARQ units may be allocated for STA2. Next, STA1 transmits its 6 HARQ coding units, and STA2 transmits it 4 HARQ coding units, which combine to form the second TB PPDU 520. STA1 transmits a first portion 521 of the TB PPDU 520, and STA2 transmits a second portion 522 of the TB PPDU 520. In this situation, the STA's send the HARQ coding unit information in the MAC layer, and it is the STA's that specify the HARQ coding unit information.

Figure 6:
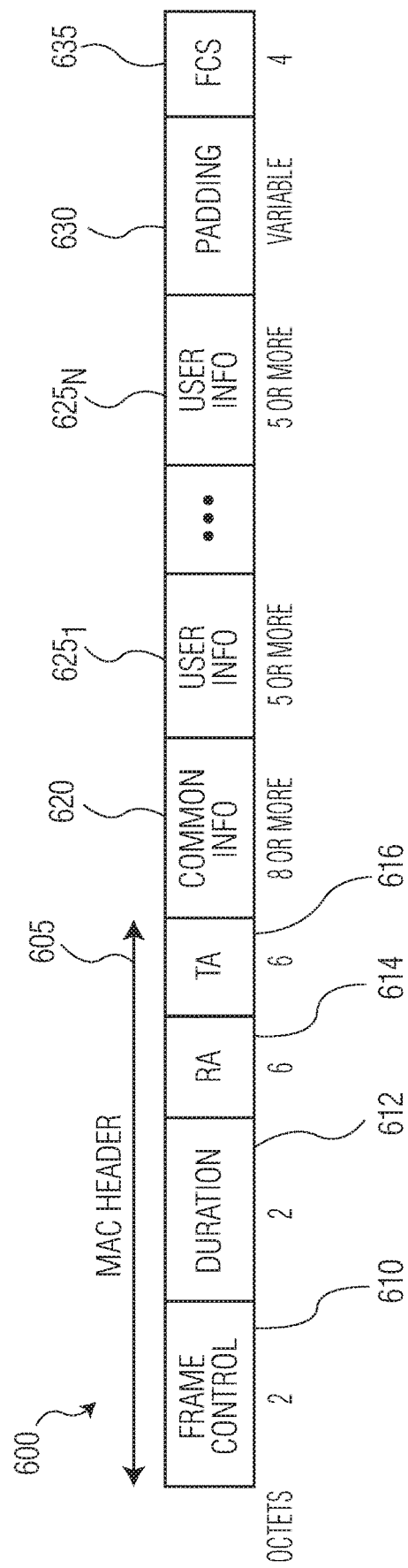
FIG. 6 illustrates the structure of the trigger frame.

The trigger design for soliciting HARQ information will now be described. FIG. 6 illustrates the structure of the trigger frame 600. The trigger frame 600 includes a MAC header 605 that includes the frame control field 610, the duration field 612, the receive address (RA) 614 of the recipient STA, and the transmit address (TA) 616 of the transmitting station. Next, the trigger frame 600 includes common information 620, that includes information that applies to all users. Next, the trigger frame 600 includes a plurality of user information fields $625_1 \ldots 625_N$. This is then followed by a variable amount of padding 630 and the last field (FCS) 635.

In a first option for the trigger design, the user info fields 625 in the trigger frame 600 all have the same length. In this situation, the common information field 620 may indicate the length of the user information fields 625. HARQ soliciting and non-HARQ soliciting may be included in one HE TB PPDU from different STAs. In this situation, the user information includes fields used to specify the HARQ coding information. It is noted that the HARQ coding unit information may include specifying HARQ coding units with different lengths. The HARQ related fields in the user information fields 625 related to non-HARQ transmission are reserved, e.g., the padded fields are filled with the reserved values. Further, when different users have a different numbers of solicited HARQ units, the user information 625 for users with few HARQ units are padded to the length indicated in the common field information 620, e.g., the padded fields are filled with the reserved values.

In a second option for the trigger design, the user information fields 625 in the trigger frame 600 may have different lengths. In this option, the lengths of the user information fields 625 vary based upon whether HARQ units are solicited and the various number of solicited HARQ units.

Figure 7:
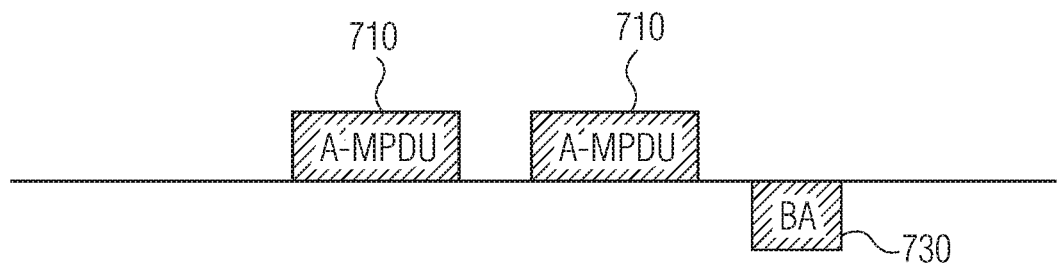
FIG. 7 illustrates a chase combining HARQ scenario.

When using HARQ coding, the BA frame needs to be adapted. How this may be accomplished will now be described. FIG. 7 illustrates a chase combining HARQ scenario. A first A-MPDU 710 is sent by the STAs to the AP followed by a second A-MPDU 720. In this situation the first A-MPDU 710 and the second A-MPDU 720 send the same information and parity bits, which may then be combined to further overcome errors in transmission. The AP then determines which HARQ units were correctly received, and then transmits a BA frame 730 indicating which HARQ units were correctly received and which HARQ units need to be resent.

Figure 8:
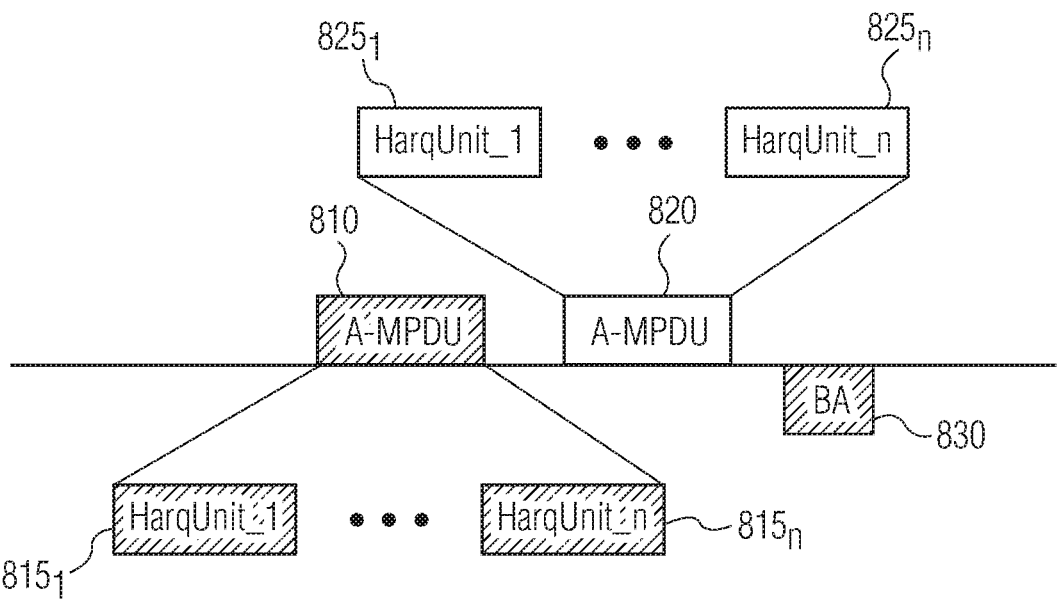
FIG. 8 illustrates an incremental redundancy HARQ scenario.

FIG. 8 illustrates an incremental redundancy HARQ scenario. A first A-MPDU 810 is sent by the STAs to the AP. The first A-MPDU 810 includes a plurality of HARQ units $815_1$-$815_n$. Then the STAs send a second A-MPDU 820 to the AP including a plurality of HARQ units $825_1 \ldots 825_n$. A different set of code bits are generated and sent in the first A-MPDU 810 and the second A-MPDU 820 for the same information bits. The AP uses both sets of code bits from the first A-MPDU 810 and the second A-MPDU 820 to recover the transmitted information. As a result, if the first set of codes bits in A-MPDU 810 are not received, the AP cannot decode the transmitted information using only the second set of received coded bits.

Figure 9:
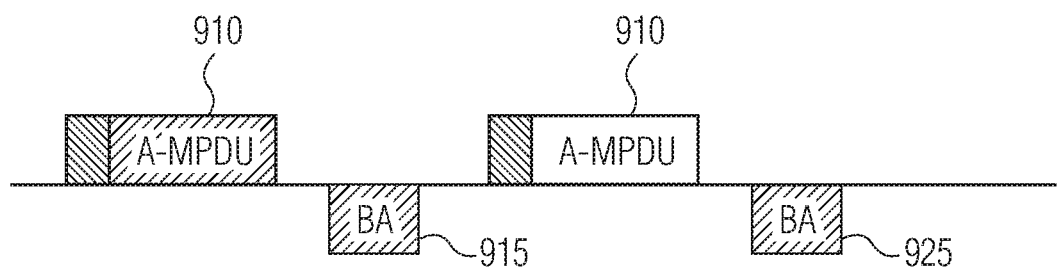
FIG. 9 illustrates a first embodiment where acknowledgement is requested for each HARQ transmission.

When the STAs send an A-MDPU, the physical header may be used to indicate if an acknowledgement is solicited for the specific A-MPDU. FIG. 9 illustrates a first embodiment where acknowledgement is requested for each HARQ transmission. A first A-MPDU 910 is transmitted requesting an acknowledgement. The AP in response sends back a BA frame 915. Then the second A-MPDU 920 is transmitted also requesting an acknowledgement, and in response, the AP sends a BA frame 925.

Figure 10:
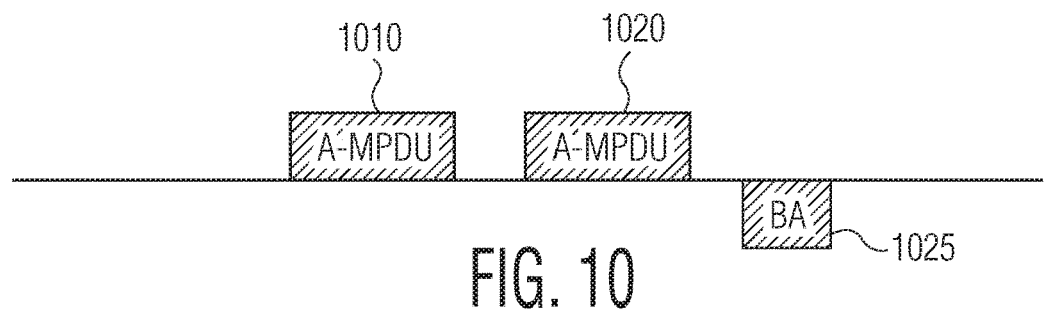
FIG. 10 illustrates a second embodiment where acknowledgement is requested after all of the A-MPDUs are transmitted.

FIG. 10 illustrates a second embodiment where acknowledgement is requested after all of the A-MPDUs are transmitted. In FIG. 10, a first A-MPDU 1010 is transmitted without soliciting an acknowledgement. Then a second A-MPDU 1020 is transmitted that requests an acknowledgement. In response to the request for acknowledgement, the AP sends a BA frame 1025 to acknowledge receipt of the first A-MPDU 1010 and the second A-MPDU 1020.

It is possible for both options to be available to a wireless system. Accordingly, HARQ negotiation may indicate the option that is to be used for HARQ transmission. As will be described below, the HARQ PHY header or a frame exchange may be used to indicate when the acknowledgement of the HARQ transmission is to be sent.

Figure 11A:
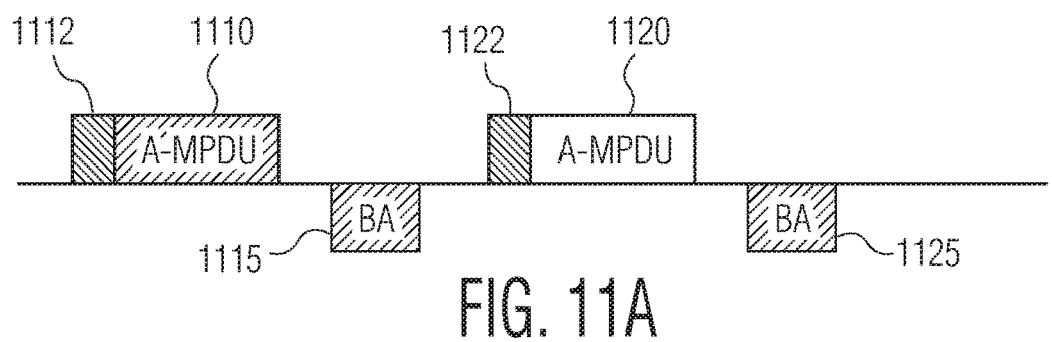
FIGS. 11A and 11B illustrate using the HARQ PHY header to indicate the solicitation of an acknowledgement frame.
Figure 11B:
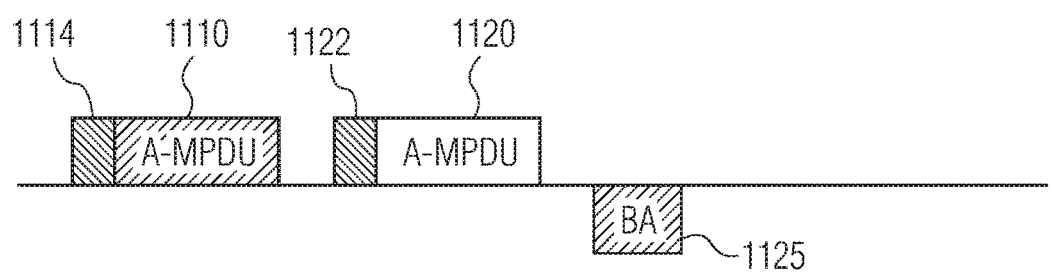

FIGS. 11A and 11B illustrate using the HARQ PHY header to indicate the solicitation of an acknowledgement frame. In FIG. 11A, a first A-MPDU 1110 is transmitted with a PHY header 1112. The PHY header 1112 indicates that an acknowledgement is requested for this A-MPDU 1110. The AP reads the PHY header 1112 and in response sends back a BA frame 1115. Then a second A-MPDU 1120 is transmitted with a PHY header 1122. Again, the PHY header 1122 indicates that an acknowledgement is requested for this A-MPDU 1120. The AP reads the PHY header 1122 and in response sends back a BA frame 1125.

In FIG. 11B, a first A-MPDU 1110 is transmitted with a PHY header 1114. The PHY header 1114 indicates that an acknowledgement is not requested for this A-MPDU 1110. The AP reads the PHY header 1112 and does not send back a BA frame for the first A-MPDU 1110. Then a second A-MPDU 1120 is transmitted with a PHY header 1122. The PHY header 1122 indicates that an acknowledgement is requested for this A-MPDU 1120. The AP reads the PHY header 1122 and in response sends back a BA frame 1125.

In yet another embodiment, a frame exchange may take place between the AP and the STAs that indicates whether acknowledgements are solicited after every HARQ transmission. This may be done by the AP sending a control frame specifying the type of HARQ acknowledgement to be used by the stations.

A not-acknowledged (NAK) frame may be useful to indicate that nothing in the HARQ PPDU was correctly received except the information of the initiator and the responder. This NAK is useful for IR HARQ operation, where if the first transmission is not received correctly, the second transmission is not useful. In such a situation the NAK frame may be transmitted, otherwise a ACK or BA frame may be transmitted to indicate which HARQ units (or non-HARQ units) were correctly received. A DL HARQ MU PPDU may solicit a single user (SU) or MU acknowledgement though the HE TB PPDU. It is noted that the NAK frame is not allowed to respond to a received DL HARQ MU PPDU if the trigger frame or trigger information is not received correctly.

Figure 12:
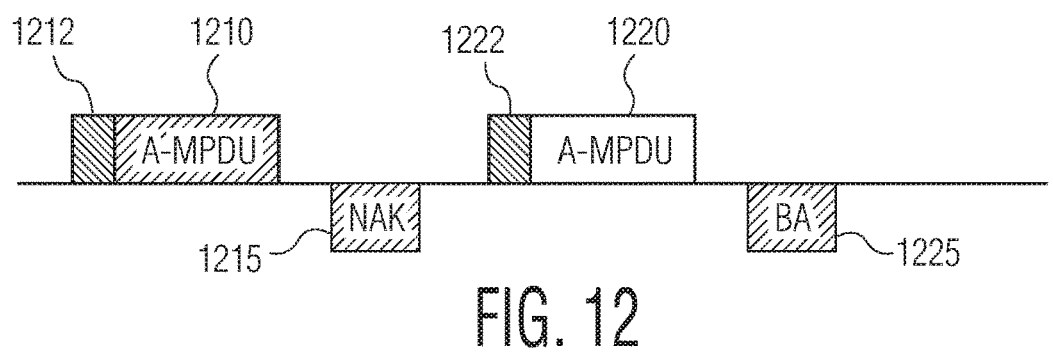
FIG. 12 illustrates the use of the NAK frame.

FIG. 12 illustrates the use of the NAK frame. In FIG. 12, a first A-MPDU 1210 is transmitted with a physical header 1212 soliciting an acknowledgment. In this situation, the information none of the information in the A-MPDU was correctly received except for the information of the initiator and the responder, so a NAK frame 1215 is sent back. In response the STAs resend a second A-MPDU 1220 having a physical header 1222 soliciting an acknowledgement. In response, the AP sends a BA frame as some of the information was correctly received from the second A-MPDU 1220.

The following rules may be used for a NAK transmission where no frames from the initiator are decoded correctly but the responder can decode the initiator and responder identifiers in the HARQ PPDU. If the medium is idle (that is both PHY carrier sensing and virtual carrier sensing are idle) and no frames in HARQ PPDU are correctly decoded, the NAK is transmitted. If the virtual carrier sensing is busy (but the PHY carrier sensing is idle), and no frames in HARQ PPDU are correctly decoded, in a first option the NAK is transmitted and in a second option the NAK is not transmitted. If the PHY carrier sensing is busy, no frames in HARQ PPDU are correctly decoded, and the responder assumes that the HARQ combination operation can be done (after the combination of the first HARQ PPDU and the second HHARQ PPDU, the chance to decode the frames becomes higher), in a first option the NAK is transmitted, and in a second option the NAK is not transmitted.

Figure 13A:
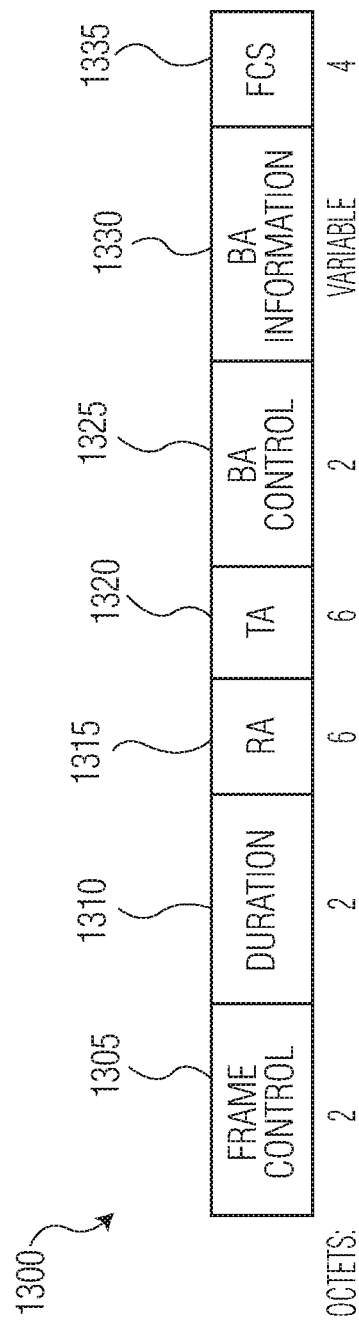
FIGS. 13A and 13B illustrate a first embodiment for an acknowledgement format using the BA control field for M-BA and C-BA types of BA frames.
Figure 13B:
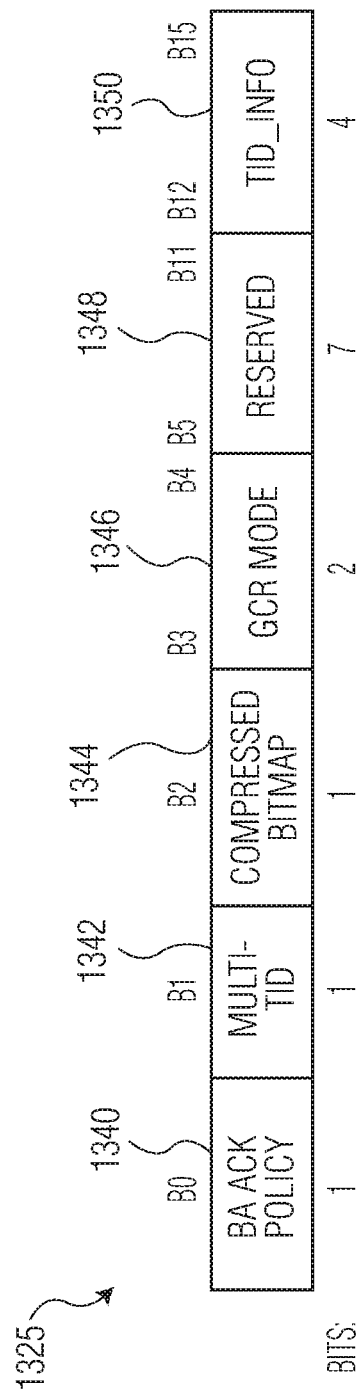

FIGS. 13A and 13B illustrate a first embodiment for an acknowledgement format using the BA control field for M-BA and C-BA types of BA frames. FIG. 13A shows the fields found in a BA frame 1300. The BA frame 1300 includes a frame control field 1305, a duration field 1310, an RA field 1315, a TA field 1320, a BA control field 1325, a BA information field 1330, and FCS 1335. The frame control 1305, duration 1310, RA 1315, TA 1320, and FCS 1335 fields have the same description as in FIG. 6. The BA control field 1235 includes control information and will be further described below. The BA information field 1330 may include a HARQ unit bit map that indicates by bit position which HARQ units were successfully received (or not received as the case may be). FIG. 13B illustrates the fields found in the BA control field 1325. The BA Ack policy field 1340 indicates whether a normal ACK or no ACK is used. The Multi-TID field 1342 indicates where there are multiple QoS streams. The compressed bitmap filed 1344 indicates support for ACK for fragments in the BA frame. The GCR (group cast with retries) mode field 1346 indicates whether GCR is used. The TID_INFO (traffic identifier) field provides information about each TID. The reserved bits may be used to indicate the presence of a HARQ bitmap. It may be any of the bits in the reserved field. When this bit is set and the BA control is for C-BA, then the BA information field 1330 includes the HARQ unit bitmap indicating the status of each HARQ unit. When this bit is set and the BA control indicates M-BA, at least some Per AID TID info fields include the HARQ bitmap.

Figure 14A:
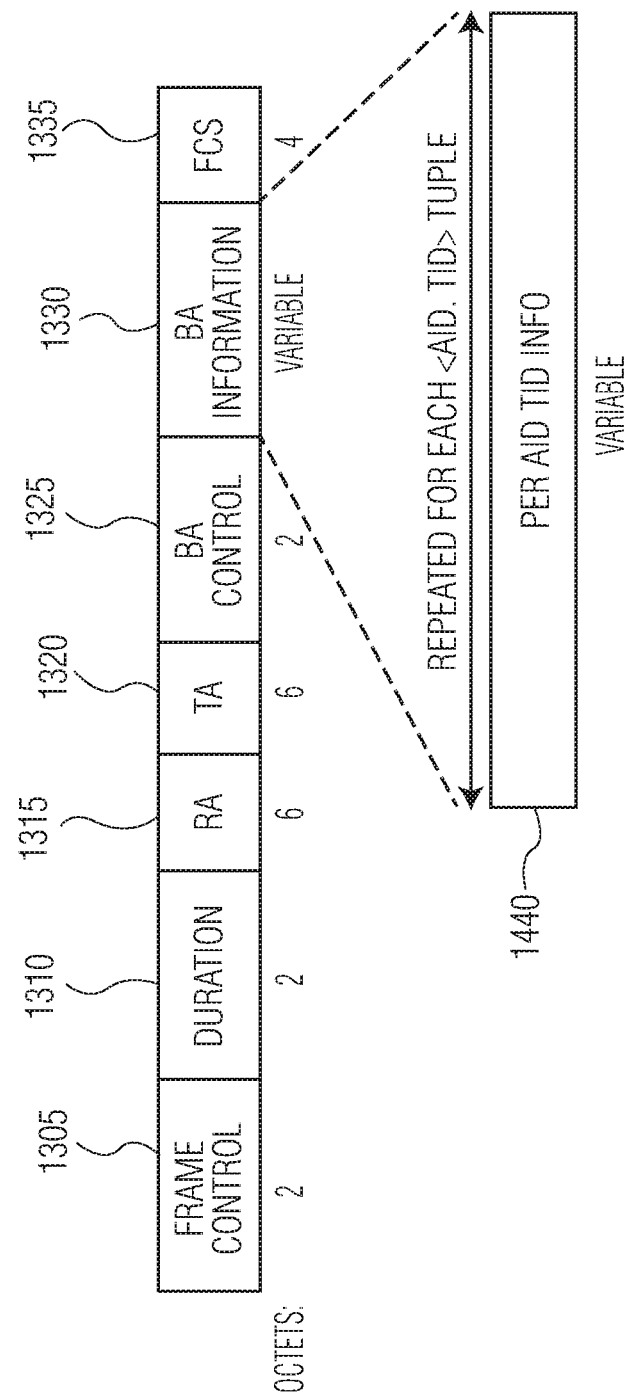
FIGS. 14A-14C illustrate a second embodiment for an acknowledgement format using the BA control field for M-BA type of BA frame.
Figure 14B:
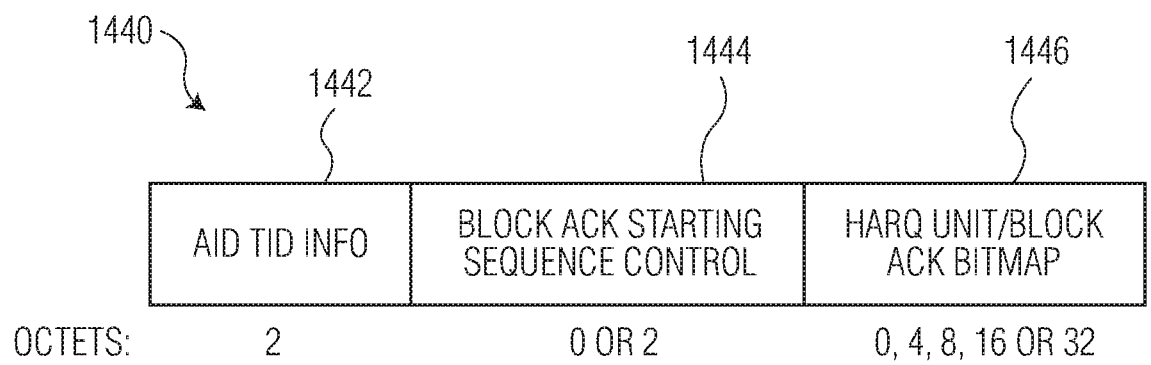
Figure 14C:
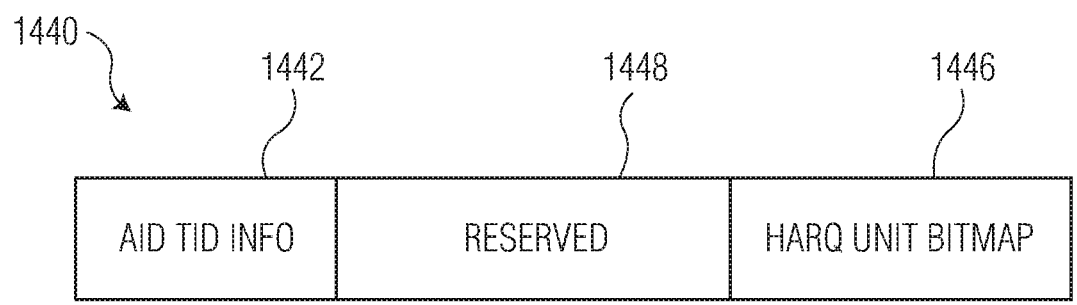

FIGS. 14A-14C illustrate a second embodiment for an acknowledgement format using the BA control field for M-BA type of BA frame. The changes to the M-BA are in the Per AID TID information fields. FIG. 14A shows how the BA information field 1330 includes Per AID TID information 1440. This is a combination of access identifier (AID) and traffic identifier (TID) information for each STA. There are two different ways that this Per AID TID Info 1440 may be used to carry a HARQ unit bitmap. FIG. 14B illustrates a first example of using the Per AID TID Info 1140 for carrying the HARQ unit bitmap. The Per AID TID Info 1440 may include AID TID Info 1442 that occupies two octets that includes values for the AID and TID. Next, the Block Ack Starting Sequence Control field 1444 is shown, and this field has reserved values. In one example, in IEEE 802.11ax bit B3 of the Fragment Number fields may be set to 1 to indicate the presence of a HARQ unit bitmap. The final variable sized field is a HARQ Unit/BA Bitmap that is the bitmap indicating the whether the HARQ units or packets (in the non-HARQ coded situation) were properly received. This field may include 0, 4, 8, 16, 32, or some other number of octets to carry the HARQ Unit/BA bitmap.

FIG. 14C illustrates a second example of using the Per AID TID Info 1140 for carrying the HARQ unit bitmap. As above, the Per AID TID Info 1440 may include AID TID Info 1442 that occupies two octets that includes values for the AID and TID, but in this case a reserved TID value is used to indicate the use of a HARQ bitmap. Next, a reserved field 1448 is shown, and this field has reserved values and may not be present or may be two octets if present. As above, the final variable sized field 1446 is a HARQ Unit/BA Bitmap that is the bitmap indicating the whether the HARQ units or packets (in the non-HARQ coded situation) were properly received. This field may include 0, 4, 8, 16, 32, or some other number of octets to carry the HARQ Unit and the BA bitmap, the HARQ Unit bitmap only, or the BA bitmap only. Additionally, to indicate a NAK as described above, the Ack type may be set to 1, and the Reserved field 1448 and the HARQ Unit bitmap field 1446 are not included.

Further, in a M-BA, some Per AID TID Info fields may indicate a HARQ BA Bitmap while other Per AID TID Info fields indicate BA Bitmap, e.g.: only a BA/Ack in one or more Per AID TID Info fields addressed to a STA; only NAK in one Per AID TID Info field addressed to a STA; or HARQ unit bitmap in one Per AID TID Info field addressed to a STA and BA/Ack in one or more Per AID TID Info fields addressed to the same STA. Also the NAK could be the following values: all 0 in BA bitmap; all 0 in HARQ unit bitmap; or a new defined Per AID TID Info field.

Figure 15:
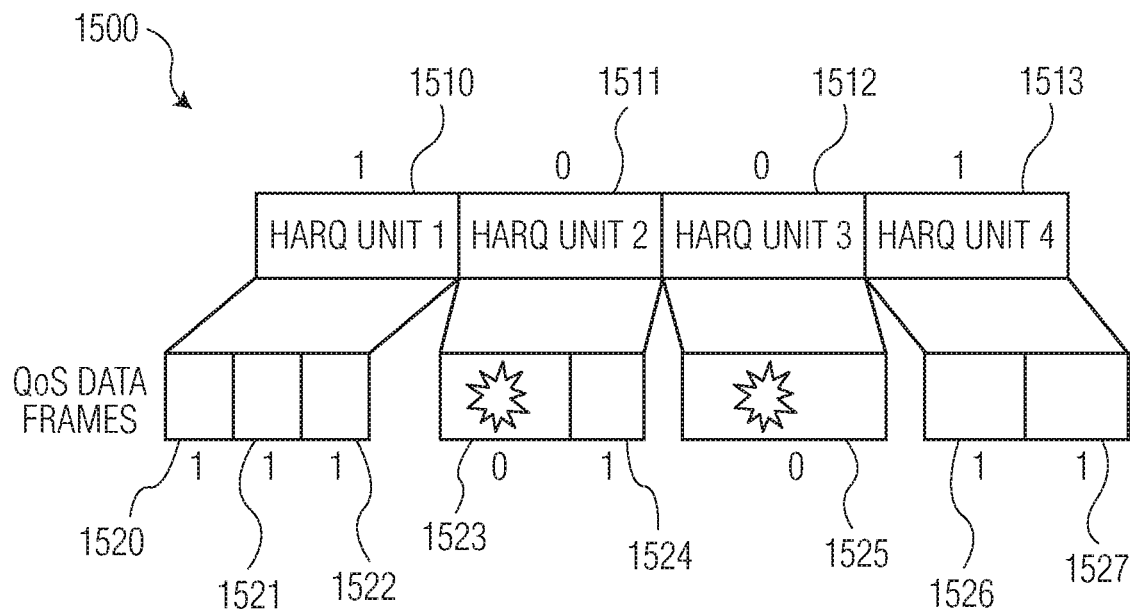
FIG. 15 illustrates a data frame having four HARQ units.

A few example acknowledgement formats will now be described. FIG. 15 illustrates a data frame having four HARQ units 1510-1513. The first HARQ unit 1410 include three QoS data frames 1520-1522. The second HARQ unit 1511 includes two QoS data frames 1523-1524. The third HARQ unit 1412 includes one QoS data frame 1525. The fourth HARQ unit 1513 includes two QoS data frames 1526-1527. If the responding STA identifies the initiator and responder of the HARQ PPDU and at least one of HARQ coding units are decoded correctly, the following three acknowledgement formats are possible. In the first format, the responding STA may send BA or Ack to indicate the correctly received frames. In this example, the bitmap would be 11101011, as only QoS frames 1523 and 1525 were not correctly received. The initiating STA figures out the unsuccessful HARQ coding units through BA bitmap or Ack. When each HARQ unit includes one frame, HARQ unit bitmap is not needed. In the second format, the responding STA can send the BA to indicate correctly received HARQ coding units through HARQ unit bitmap, which in this example is 1001 as HARQ units 1511 and 1512 were not correctly received. In the third format, the responding STA may send BA or Ack to indicate the correctly received HARQ coding units and the correctly received frames explicitly. In this example the HARQ unit bitmap of 1001 is sent along with the BA bitmap of 11101011.

The acknowledgement of a HARQ PPDU may have different lengths based on the reception of HARQ units and frames. For example, only a HARQ unit bitmap or a BA frame bitmap is transmitted when the initiator of HARQ PPDU expect both of them. When the AP allocates resource for the UL HE TB acknowledgement of the HARQ PPDU, the resources provided to each STA should be enough for the longest acknowledgement frame. When the transmit opportunity (TXOP) responder transmits acknowledgement in a PPDU other than the HE TB PPDU, the TXOP responder calculates the TX time of the PPDU per the primary MCS/date rate and longest bitmap length, i.e., the primary_TX_time. The candidate MCS/data rate is the MCS/data rate where the TX time of the responding acknowledge frame with the real bitmap length per the candidate MCS/data rate is not more than the primary_TX_time.

Figure 16:
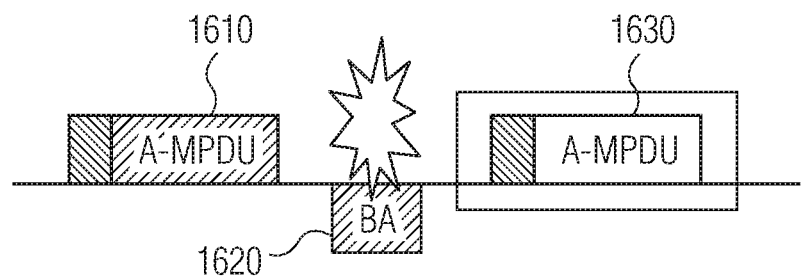
FIG. 16 illustrates a HARQ frame sequence.

FIG. 16 illustrates a HARQ frame sequence. A STA transmits a first A-MPDU 1610. The AP may attempt to reply with a BA frame 1620. But the BA frame 1620 may not be received by the STA. In this situation, the STA will not send the second A-MPDU 1630 if the following conditions are true: 1) IR HARQ is used; 2) the HARQ A-MPDU 1610 requires acknowledgement; and 3) the acknowledgement or NAK of the first HARQ A-MPDU 1610 is not received by the initiating STA.

Figure 17:
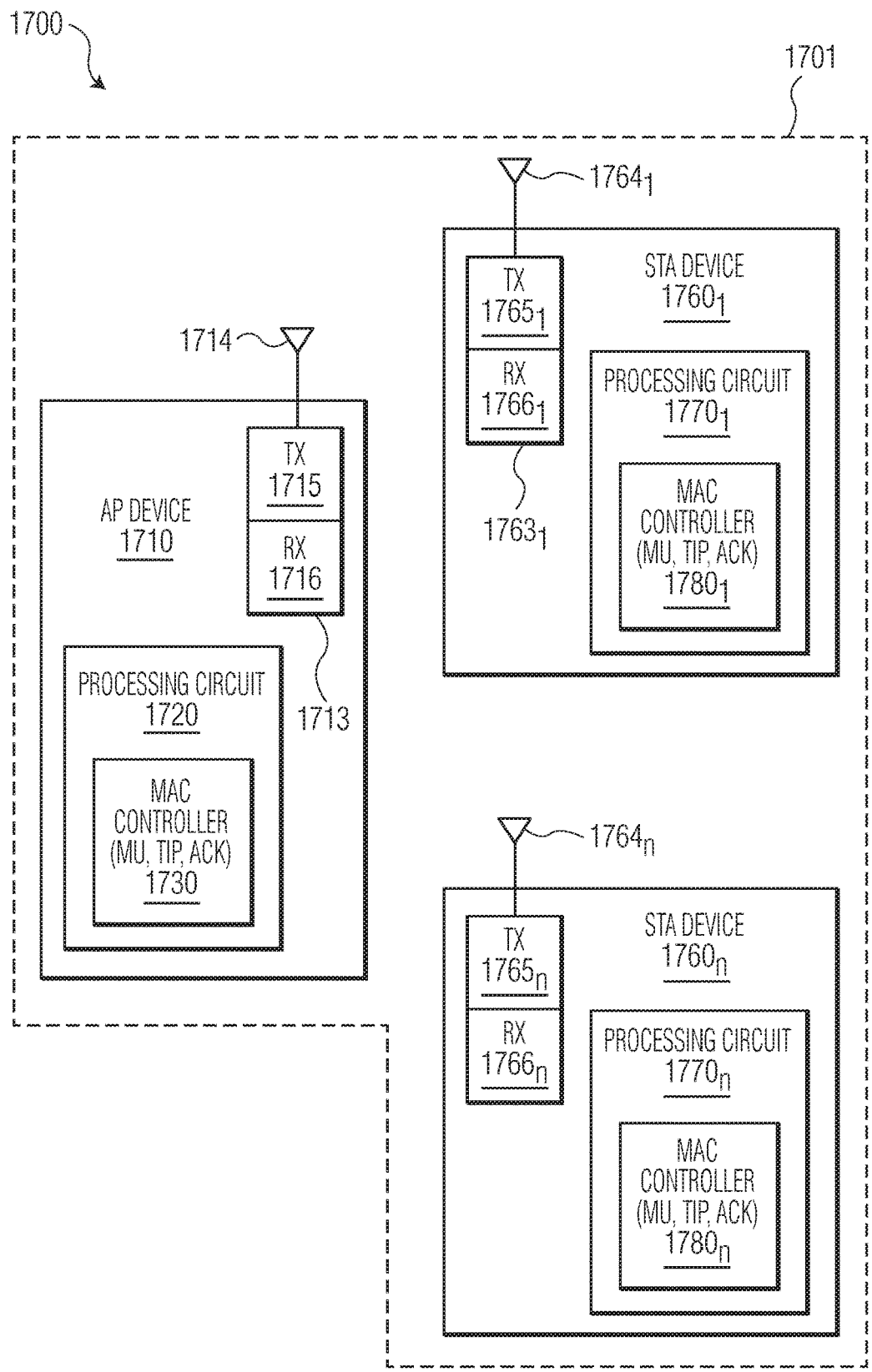
FIG. 17 shows a block diagram of a network according to an embodiment.

FIG. 17 shows a block diagram of a network 1700 according to an embodiment. The network 1700 includes a first electronic device 1710 and one or more second electronic devices $1760_1$-$1760_n$ that conduct wireless communication in a central coordinated manner to enable multi-user (MU) downlink and/or uplink transmissions. In the FIG. 17 example, the first electronic device 1710 is a central coordinating device configured to assign resources (e.g., time, frequency, resource element, resource unit) of a communication channel for transmission between the first electronic device 1710 and the second electronic devices $1760_1$-$1760_n$, and coordinate multi-user downlink and/or uplink transmission between the first electronic device 1710 and the second electronic devices $1760_1$-$1760_n$. Further, the first electronic device 1710 and the second electronic devices $1760_1$-$1760_n$ are configured to perform various operations, such as multi-user resource requests, traffic class selections, and the like to support the MU downlink and/or uplink transmission, and improve spectral efficiency.

The network 1700 includes interconnections that are implemented using any suitable network technology, such as wired, wireless, a local area network (LAN), a wireless LAN (WLAN), a fiber optical network, a wide area network (WAN), a peer-to-peer network, the Internet, and the like. In an example, the first electronic device 1710 and the second electronic devices $1760_1$-$1760_n$ are in a basic service set (BSS) 1701 that is implemented using WLAN technology to interconnect the first device 1710 and the second devices $1760_1$-$1760_n$. The network 1700 includes other suitable interconnections (not shown), such as a LAN, a fiber optical network, and the like to provide connections for the BSS 1701 to be connected to for example Internet.

In an embodiment, the BSS 1701 is an infrastructure type basic service set. The first electronic device 1710 is an access point (AP) device, and the second electronic devices $1760_1$-$1760_n$ are station (STA) devices. The second electronic devices $1760_1$-$1760_n$ communicate through the first device 1710, and the first device 1710 includes network hardware and software configured to serve as a bridge to allow wireless compliant devices, such as the second electronic devices $1760_1$-$1760_n$ to connect to other part of the network 1700.

Each of the second electronic devices $1760_1$-$1760_n$ in the network 1700 can be any suitable device, such as a desktop computer, a laptop computer, a tablet computer, a smart phone, a personal digital assistant (PDA), a smart watch, a smart camera, a smart TV, a smart voice recorder, a wearable device, a sensor, and the like. According to an aspect of the disclosure, the second electronic devices $1760_1$-$1760_n$ in the network 1700 are implemented using the same version or different versions of a wireless standard, such as various IEEE 802.11 standards.

In the FIG. 17 example, the second electronic devices $1760_1$-$1760_n$ share resources of a communication channel for a transmission, and the first electronic device 1710 is configured to assign the resources of the transmission (e.g., time, frequency, resource element, resource unit) to data unit (e.g., frame) exchanges between the first electronic device 1710 and the second electronic devices $1760_1$-$1760_n$. The second electronic devices $1760_1$-$1760_n$ are configured to perform transmission according to the assigned resources. For example, at a time, the first electronic device 1710 plans to transmit data units respectively to a group of second electronic devices among the second electronic devices $1760_1$-$1760_n$. The group of second electronic devices involved in a transmission is referred to as targeted second electronic devices. The first electronic device 1710 allocates resources of a transmission to the targeted second electronic devices, and performs a transmission to transmit data units respectively to the targeted second electronic devices in the same transmission according to the resource allocation of the transmission.

In another example, the first electronic device 1710 schedules to receive data units respectively from targeted second electronic devices among the second electronic devices $1760_1$-$1760_n$. The first electronic device 1710 allocates resources of a transmission to the targeted second electronic devices. The targeted second electronic devices perform transmissions in a same time duration to respectively transmit data units to the first electronic device 1710 according to resource allocation, and the first electronic device 1710 receives the data units from the targeted second electronic devices in the same scheduled time duration for example.

According to an aspect of the disclosure, devices in the BSS 1701, such as the first electronic device 1710, the second electronic devices $1760_1$-$1760_n$ and the like are configured to transmit two or more data units using an aggregation technique. In an embodiment, the first electronic device 1710 aggregates two or more media access control (MAC) protocol data units (MPDUs) to a same destination device (e.g., a second electronic device), and forms an aggregated MPDU (A-MPDU). For example, the first electronic device 1710 collects Ethernet frames (e.g., data units) to the same destination device, and wraps each frame individually with a MAC header. Then the first electronic device 1710 groups the wrapped frames into a larger frame. In the example, at the reception side, the destination device can selectively acknowledge individual Ethernet frames.

In another embodiment, one or more of the second electronic devices $1760_1$-$1760_n$ can aggregate two or more MPDUs to the first electronic device 1710, and form an A-MPDU. For example, the second electronic device 1760 a and the second electronic device 1760 n respectively collect Ethernet frames (e.g., data units) and wrap each frame individually with a MAC header. Then the second electronic device 1760 a and the second electronic device 1760 n respectively group the wrapped frames into larger frames. In another embodiment, one or more of the second electronic devices $1760_1$-$1760_n$ transmit single MPDU to the first electronic device 1710.

Generally, wireless communication traffic is classified into traffic classes according to priorities and the wireless communication traffic is buffered into queues (e.g., first-in-first-out queues) according to the traffic classes. In an embodiment, wireless communication traffic is first categorized into access categories based on the applications that generate the wireless communication traffic, and then each access category includes multiple traffic classes of different priorities. In an example, the traffic classes are identified using priorities as traffic identifiers (TIDs).

According to an aspect of the disclosure, devices in the BSS 1701, such as the first electronic device 1710, the second electronic devices $1760_1$-$1760_n$ and the like are configured to aggregate communication traffic from different traffic classes to improve transmission efficiency. In an example, the second electronic device 1760 a aggregates a first MPDU of a first traffic identifier, and a second MPDU of a second traffic identifier to form a first aggregated A-MPDU; and the second electronic device $1760_n$ aggregates a third MPDU of a third traffic identifier, and a fourth MPDU of a fourth traffic identifier to form a second aggregated A-MPDU. In the example, the first aggregated A-MPDU and the second aggregated A-MPDU are transmitted in synchronization respectively by the second electronic device $1760_1$ and the second electronic device $1760_n$ during a transmission opportunity (TXOP). In an example, the first traffic identifier is the same as the second traffic identifier. In another example, the first traffic identifier is different from the second traffic identifier. In another example, the traffic classes of the first aggregated A-MPDU are the same as the traffic classes of the second aggregated A-MPDU. In another example, the traffic classes of the first aggregated A-MPDU are different from the traffic classes of the second aggregated A-MPDU. In another embodiment, MPDUs from more than two traffic identifiers are aggregated in one A-MPDU.

According to an aspect of the disclosure, the first electronic device 1710 is configured to select traffic classes in response to resource requests from the second electronic devices $1760_1$-$1760_n$. In an embodiment, the second electronic devices $1760_1$-$1760_n$ are configured to efficiently use communication channel resource to provide the resource requests. In an example, the resource requests are provided in the form of buffer information reports. In the example, the second electronic devices $1760_1$-$1760_n$ are configured to send buffer report for two or more traffic classes in a data unit. Further, the second electronic devices $1760_1$-$1760_n$ are configured to aggregate multiple data units with buffer reports into an aggregated data unit, thus buffer reports for multiple traffic classes can be provided in one uplink transmission in an example.

Specifically, in the FIG. 17 example, the first electronic device 1710 includes a first transceiver circuit 1713 and a first processing circuit 1720 coupled together as shown in FIG. 17. In the example, the first transceiver circuit 1713 includes a first receiving circuit 1716 and a first transmitting circuit 1715 that are both coupled to a first antenna 1714, and the first processing circuit 1720 includes a MAC controller 1730 configured to perform MAC layer operations, such as processing MPDU and/or A-MPDU, extracting buffer information reports from aggregated A-MPDU, selecting traffic classes for multiple users, performing HARQ encoding and decoding, and the like.

The first transceiver circuit 1713 is configured to receive and transmit wireless signals. For example, the first receiving circuit 1716 is configured to generate electrical signals in response to captured electromagnetic waves by the first antenna 1714, process the electrical signals to extract digital streams from the electrical signals. In an example, the first transmitting circuit 1715 is configured to receive digital streams, such as management frames, data frames, and the like from for example the first processing circuit 1720, generate radio frequency (RF) signals to carry the digital streams, and emit electromagnetic waves in the air via the first antenna 1714 to transmit wireless signals that carry the digital streams.

The second electronic device $1760_1$ includes a second transceiver circuit $1760_1$ and a second processing circuit $1770_1$ coupled together. The second transceiver circuit $1760_1$ includes a second transmitting circuit $1765_1$ and a second receiving circuit $1766_1$ that are both coupled to a second antenna $1764_1$. The second processing circuit $1770_1$ includes a MAC controller $1780_1$ configured to perform MAC layer operations, such as preparing buffer information reports, aggregating frames with buffer information reports, selecting traffic classes, generating MPDU and/or A-MPDU, encoding and decoding HARQ units, and the like. Other second electronic devices are configured similarly as the second electronic device $1760_1$.

The second transceiver circuit $1760_1$ is configured to receive and transmit wireless signals. For example, the second receiving circuit $1766_1$ is configured to generate electrical signals in response to captured electromagnetic waves by the second antenna $1764_1$ and to process the electrical signals to extract digital streams from the electrical signals. In an example, the second transmitting circuit $1765_1$ is configured to receive digital streams, such as management frames, data frames, and the like from for example the processing circuit $1770_1$, generate radio frequency (RF) signals to carry the digital streams, and emit electromagnetic waves in the air via the second antenna $1764_1$ to transmit wireless signals that carry the digital streams.

According to an aspect of the disclosure, the MAC controller $1780_1$ is configured to generate a data unit to carry buffer information for two or more traffic classes to allow the data unit to carry more buffer information to the first electronic device 1710, and thus to improve communication efficiency. In an example, the MAC controller $1780_1$ counts the length (e.g., the number of bytes) of unacknowledged data units in a buffer that buffers data units for a traffic class. The length of unacknowledged data units in the buffer is indicative of pending uplink traffic, and is used as buffer information to request resource for uplink transmission.

In an embodiment, the MAC controller $1780_1$ is configured to determine a scale factor for the length information, thus the length information is provided with a reduced number of bits, thus length information for more traffic classes can be carried in one data unit. In another embodiment, the MAC controller $1780_1$ is configured to sum the length information of multiple traffic classes, and let the data unit to carry the summed length information. In another embodiment, the MAC controller $1780_1$ is configured to aggregate two or more data units with buffer information of different traffic classes into one aggregated data unit, thus the aggregated data unit carries buffer information for more traffic classes. Further, the data may be HARQ encoded for transmission as described above.

Further, according to an aspect of the disclosure, the MAC controller 1730 and the MAC controllers $1780_1$-$1780_n$ are configured to aggregate data units (e.g., MPDUs) from selected traffic classes to generate an aggregated data unit (e.g., A-MPDU). In an embodiment, a primary access category is selected by an AP device (e.g., the first electronic device 1710), a secondary access category is selected by the AP device or a STA device (e.g., the second electronic device $1760_1$). The MAC controller 1730 and the MAC controllers $1780_1$-$1780_n$ are configured to aggregate data units.

Further, according to an aspect of the disclosure, the MAC controller 1730 is configured to generate a data unit to carry block acknowledgement requests for multiple traffic classes. In an example, the MAC controller 1730 aggregates multiple block acknowledgement request frames respectively for multiple traffic classes into a larger frame. In another example, the MAC controller 1730 generates a frame that carries a multi-TID block acknowledgement request. In another example, the MAC controller 1730 inserts a multi-TID block acknowledgement request in a field of a frame, such as a field in a trigger frame. Examples of the data units are discussed above.

In an embodiment, the first electronic device 1710 and the second electronic devices $1760_1$-$1760_n$ are implemented according to an open systems interconnection model (OSI model) with a plurality of layers, such as a physical (PHY) layer, a media access control (MAC) layer, a network layer, and the like from bottom up. In an example, the PHY layer includes transceiver circuits and baseband processing circuits in the processing circuits. In an embodiment, the MAC controller 1730 and the MAC controllers $1780_1$-$1780_n$ are implemented in the MAC layer using circuits. In another embodiment, the MAC controller 1730 and the MAC controllers $1780_1$-$1780_n$ are implemented as processors executing software instructions.

It is noted that while single antenna per device is used in the FIG. 17 example, the network 1700 can be suitably modified to use multiple input, multiple output (MIMO) antenna technology.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for transmitting hybrid automatic repeat request (HARQ) coded data by an access point, comprising:
   receiving by the access point buffered frame information from a plurality of stations;
   determining the HARQ coding information and resources for each of the plurality of stations;
   transmitting a first trigger frame including the HARQ coding information and resource information for each of the plurality of stations, wherein the first trigger frame defines an extreme high throughput (EHT) SIG-C field length, and wherein the SIG-C field includes a HARQ unit information field, a first cyclic redundancy code (CRC) of the HARQ unit information field, control field with a length that allows time for an access point to prepare for the HARQ reception, and a second CRC of the control field;
   receiving a first HARQ transmission from the plurality of stations; and
   decoding the received HARQ transmission from the plurality of stations.

2. The method of claim 1, further comprising transmitting a second trigger frame to request buffered frame information from the plurality of stations.

3. The method of claim 1, wherein the buffered frame information includes the number of buffered frames and the length of each of the buffered frames.

4. The method of claim 1, wherein the HARQ coding information includes the number of HARQ coding units and the length of each of the HARQ coding units.

5. The method of claim 1, wherein the first trigger frame includes a common information field and user information fields for each station, where the user information fields are the same length and include a HARQ coding information field.

6. The method of claim 5, wherein HARQ coding information field is padded with reserved values to fill the length of the user information field.

7. The method of claim 5, wherein HARQ coding information field is filled with reserve values for a non-HARQ transmission from a station.

8. The method of claim 1, wherein the first trigger frame includes a common information field and user information fields for each station, where the user information fields have lengths based upon a number of requested HARQ coding units.

9. The method of claim 1, further comprising sending an acknowledgment for each of the transmissions from the stations.

10. The method of claim 1, further comprising receiving a second HARQ transmission from each of the stations, and combining the first and second HARQ transmissions from each of the stations.

11. The method of claim 10, wherein the first and second HARQ transmissions include the same HARQ coded information.

12. The method of claim 10, wherein the first and second HARQ transmissions include different HARQ coded information.

13. A method for transmitting hybrid automatic repeat request (HARQ) coded data by a station, comprising:
receiving by the station a trigger frame specifying resources for the station;
determining HARQ coding information for buffered frames to be transmitted by the station; and
transmitting a first HARQ trigger based (TB) physical protocol data unit (PPDU), wherein a physical header of the HARQ TB PPDU includes a SIG-C field including the HARQ coding information, and wherein the SIG-C field includes a HARQ unit information field, cyclic redundancy code (CRC) of the HARQ unit information field, and a reserved field with a length that allows time for an access point to prepare for the HARQ reception.

14. The method of claim 13, wherein the HARQ coding information includes the number of HARQ coding units and the length of each of the HARQ coding units.

15. The method of claim 13, further comprising transmitting a second HARQ TB PPDU, wherein the first and second HARQ TB PPDU transmissions include the same HARQ coded information.

16. The method of claim 13, further comprising transmitting a second HARQ TB PPDU, wherein the first and second HARQ TB PPDU transmissions include different HARQ coded information.

17. A method for transmitting hybrid automatic repeat request (HARQ) coded data by an access point, comprising:
transmitting a first trigger frame including resource information for each of the plurality of stations;
receiving by the access point HARQ coding information from a plurality of stations in a first HARQ trigger based (TB) physical protocol data unit (PPDU), wherein a header of the HARQ TB PPDU includes a SIG-C field including the HARQ coding information, and wherein the SIG-C field includes a HARQ unit information field, control field with a length that allows time for an access point to prepare for the HARQ reception, and a CRC of the HARQ unit information field and the control field;
transmitting a second trigger frame in response to the first HARQ TB PPDU;
receiving a second HARQ TB PPDU including HARQ coded information from the plurality of stations; and
decoding the received second HARQ TB PPDU from the plurality of stations.

18. The method of claim 17, wherein the HARQ coding information includes the number of HARQ coding units and the length of each of the HARQ coding units.

19. The method of claim 17, further comprising sending an acknowledgment to the second HARQ TB PPDU.

20. The method of claim 17, further comprising receiving a third HARQ TB PPDU from each of the stations, and combining the second and third HARQ TB PPDUs from each of the stations.

21. The method of claim 20, wherein the second and third HARQ TB PPDU include the same HARQ coded information.

22. The method of claim 20, wherein the second and third HARQ TB PPDU include different HARQ coded information.

* * * * *